(No Model.) 8 Sheets—Sheet 1.

H. A. BARNARD & J. B. CORNWALL.
CORN SHELLER.

No. 322,777. Patented July 21, 1885.

(No Model.) 8 Sheets—Sheet 3.

H. A. BARNARD & J. B. CORNWALL.
CORN SHELLER.

No. 322,777. Patented July 21, 1885.

WITNESSES
INVENTORS
Attorney (No Model.) 8 Sheets—Sheet 7.

H. A. BARNARD & J. B. CORNWALL.
CORN SHELLER.

No. 322,777. Patented July 21, 1885.

WITNESSES
INVENTORS
Attorney (No Model.) 8 Sheets—Sheet 8.
H. A. BARNARD & J. B. CORNWALL.
CORN SHELLER.
No. 322,777. Patented July 21, 1885.
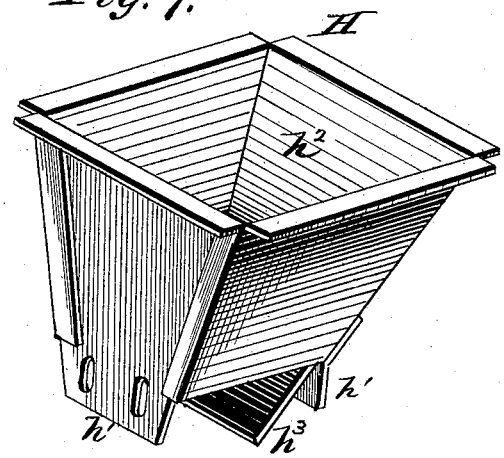
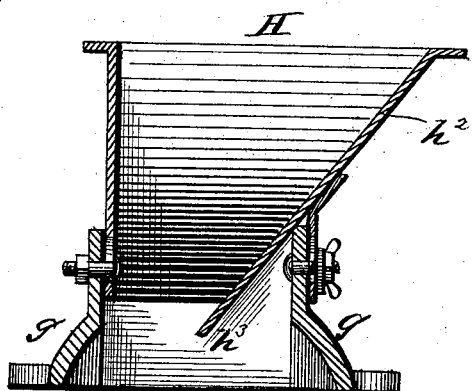
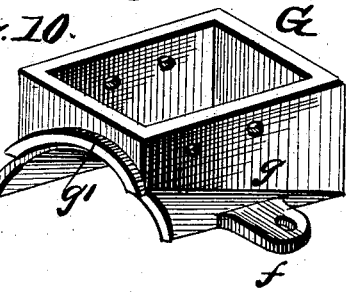
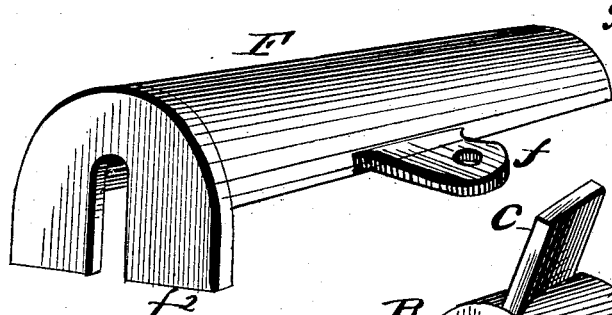
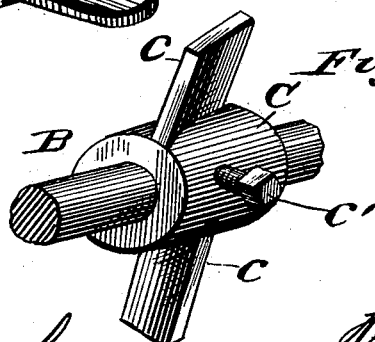
WITNESSES
INVENTORS
Heman A. Barnard
John B. Cornwall
by J. H. Alexander
Attorney

UNITED STATES PATENT OFFICE.

HEMAN A. BARNARD AND JOHN B. CORNWALL, OF MOLINE, ILLINOIS, ASSIGNORS TO BARNARD & LEAS MANUFACTURING COMPANY, OF SAME PLACE.

CORN-SHELLER.

SPECIFICATION forming part of Letters Patent No. 322,777, dated July 21, 1885.

Application filed April 16, 1885. (No model.)

*To all whom it may concern:*

Be it known that we, HEMAN A. BARNARD and JOHN B. CORNWALL, of Moline, in the county of Rock Island and State of Illinois, have invented certain new and useful Improvements in Corn-Shellers; and we do hereby declare that the following is a full, clear, and exact description thereof, reference being had to the accompanying drawings and to the letters of reference marked thereon, which form part of this specification.

Figure 1:
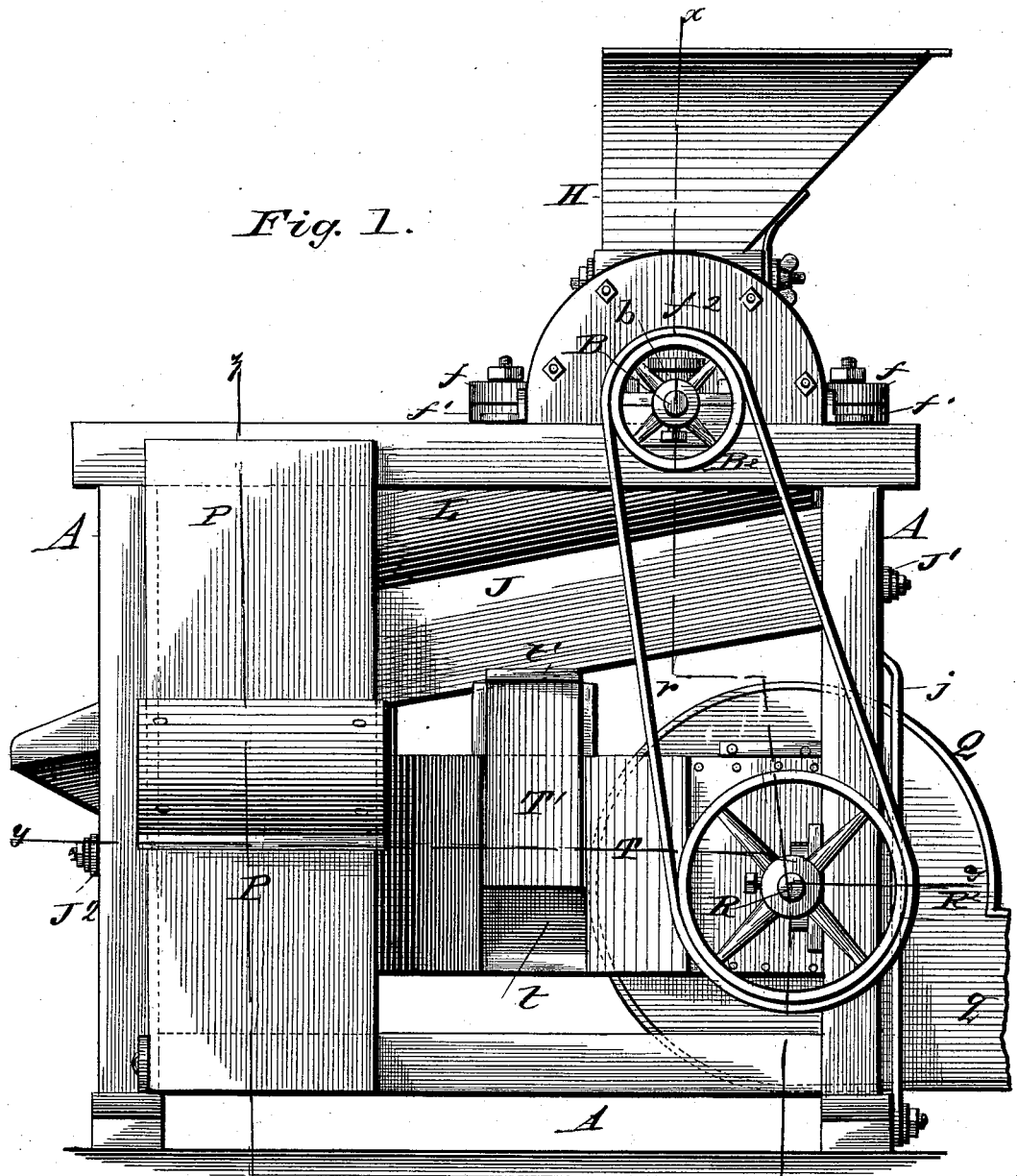
Figure 2:
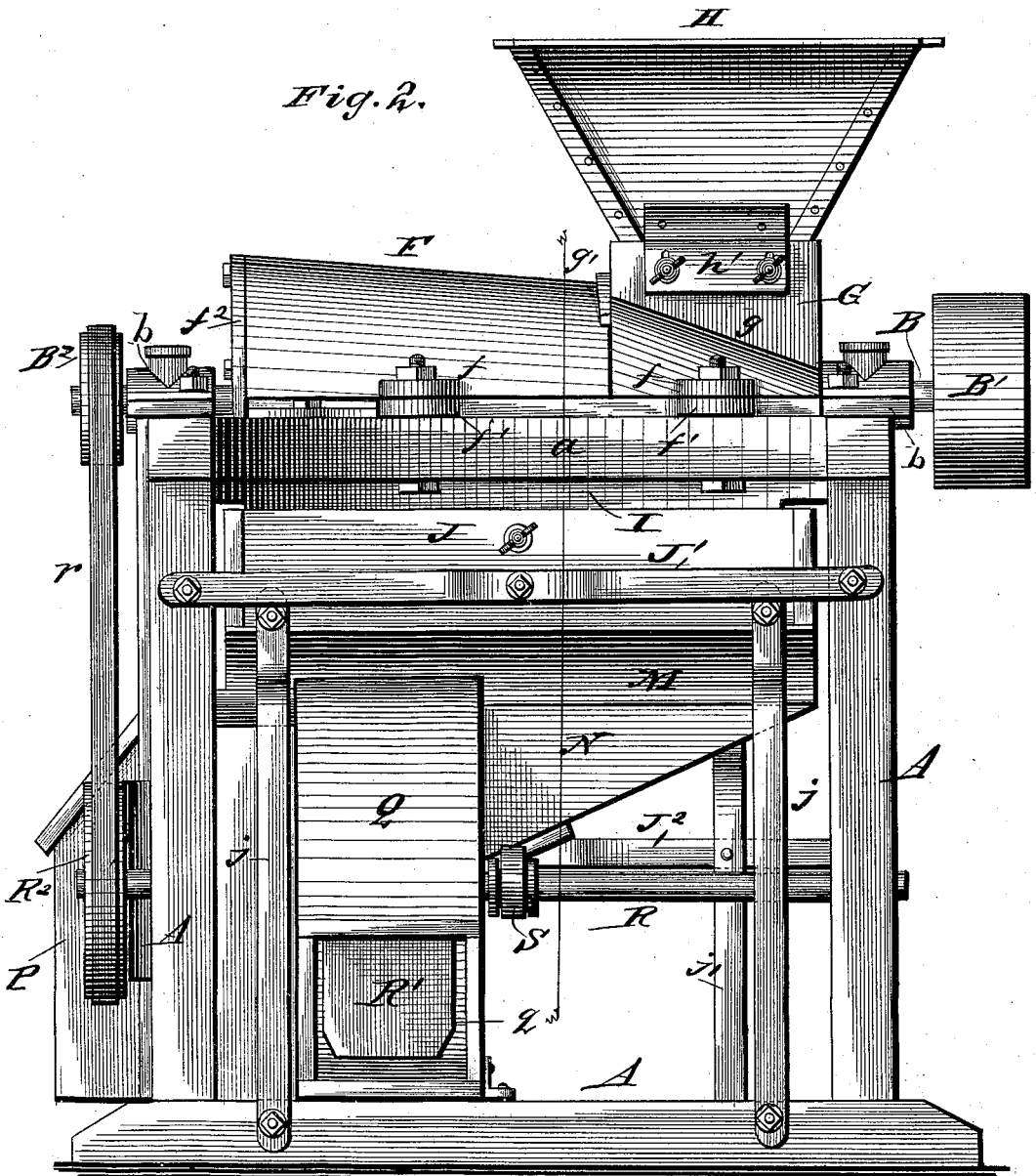
Figure 3:
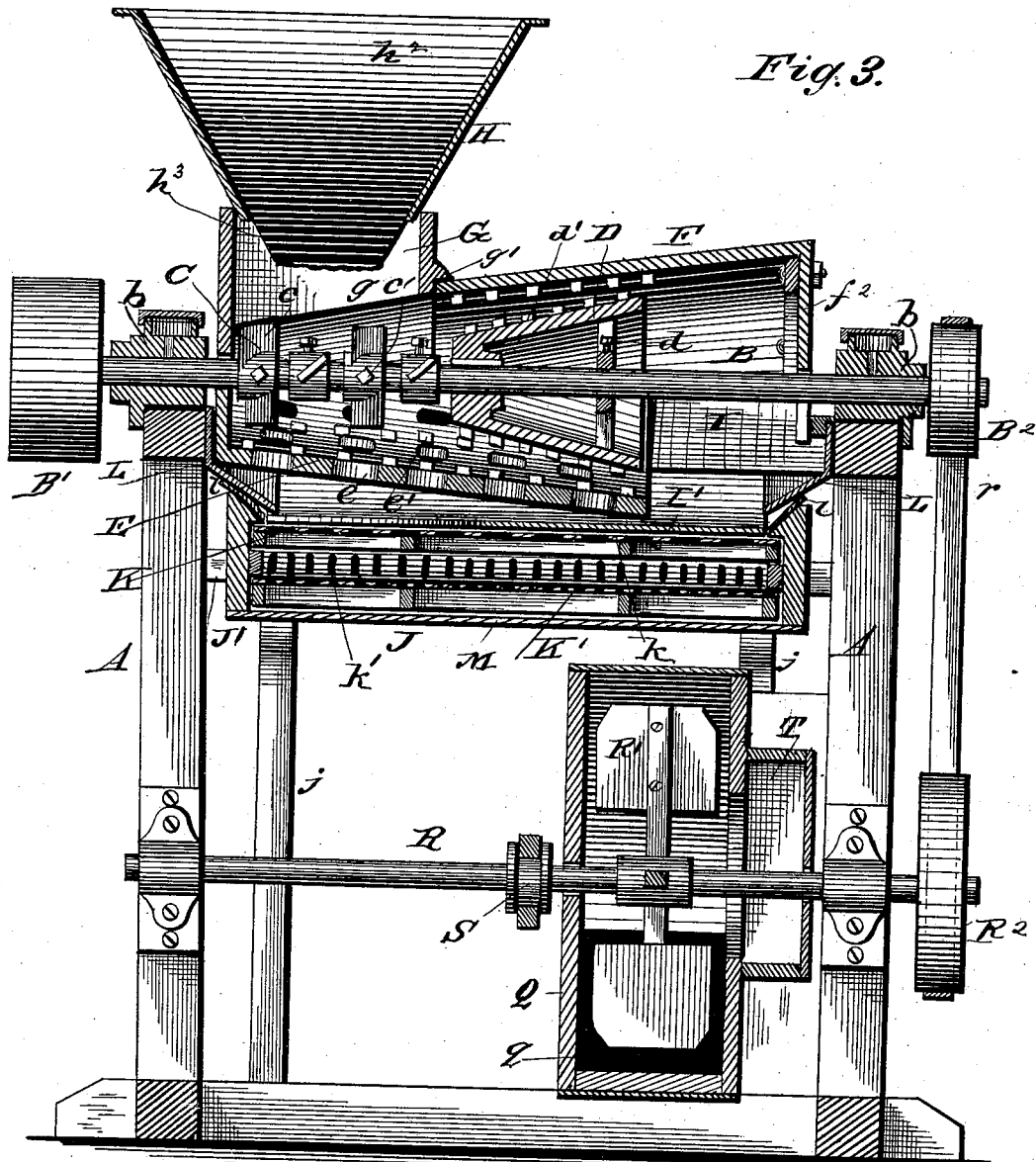
Figure 4:
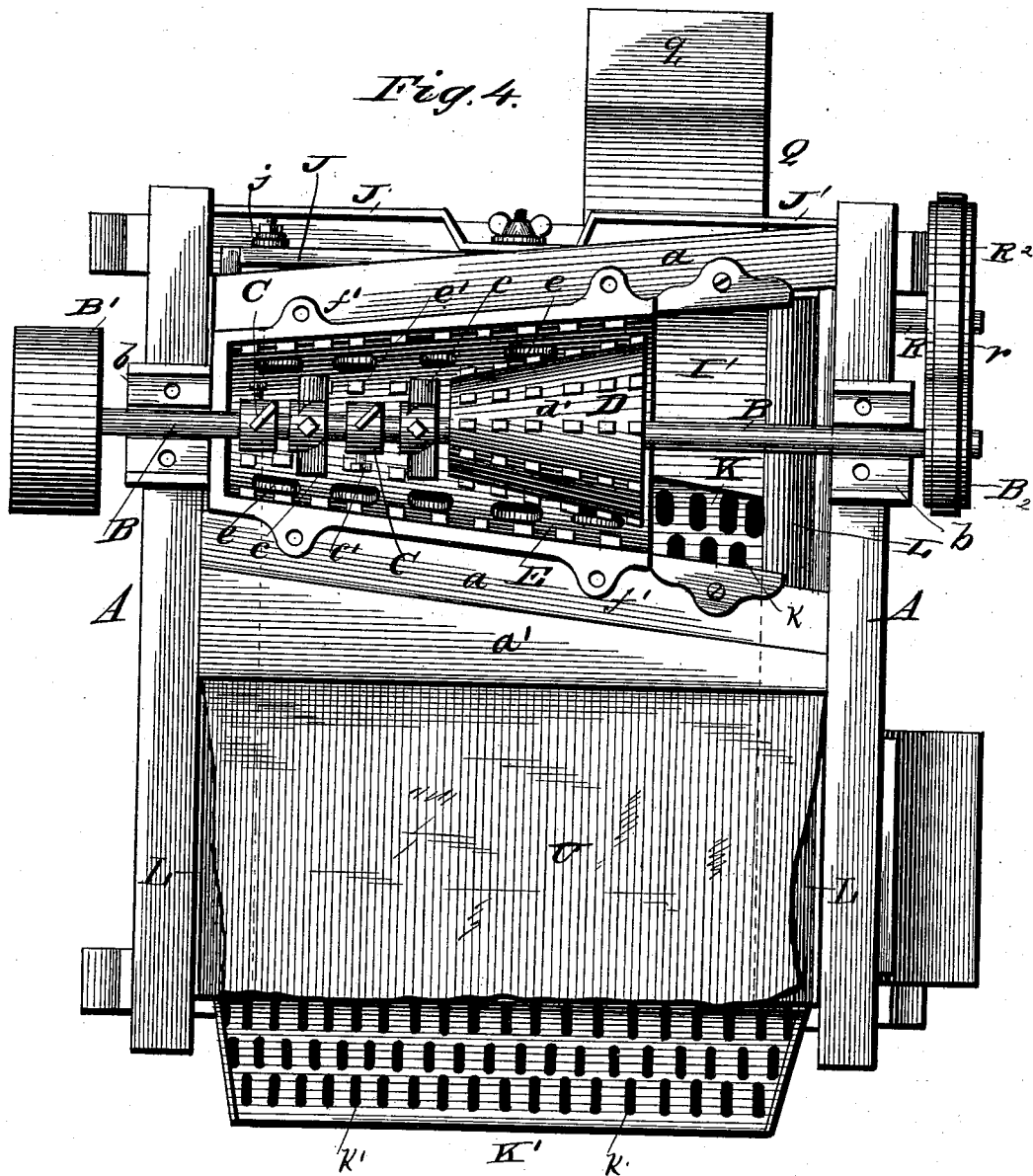
Figure 5:
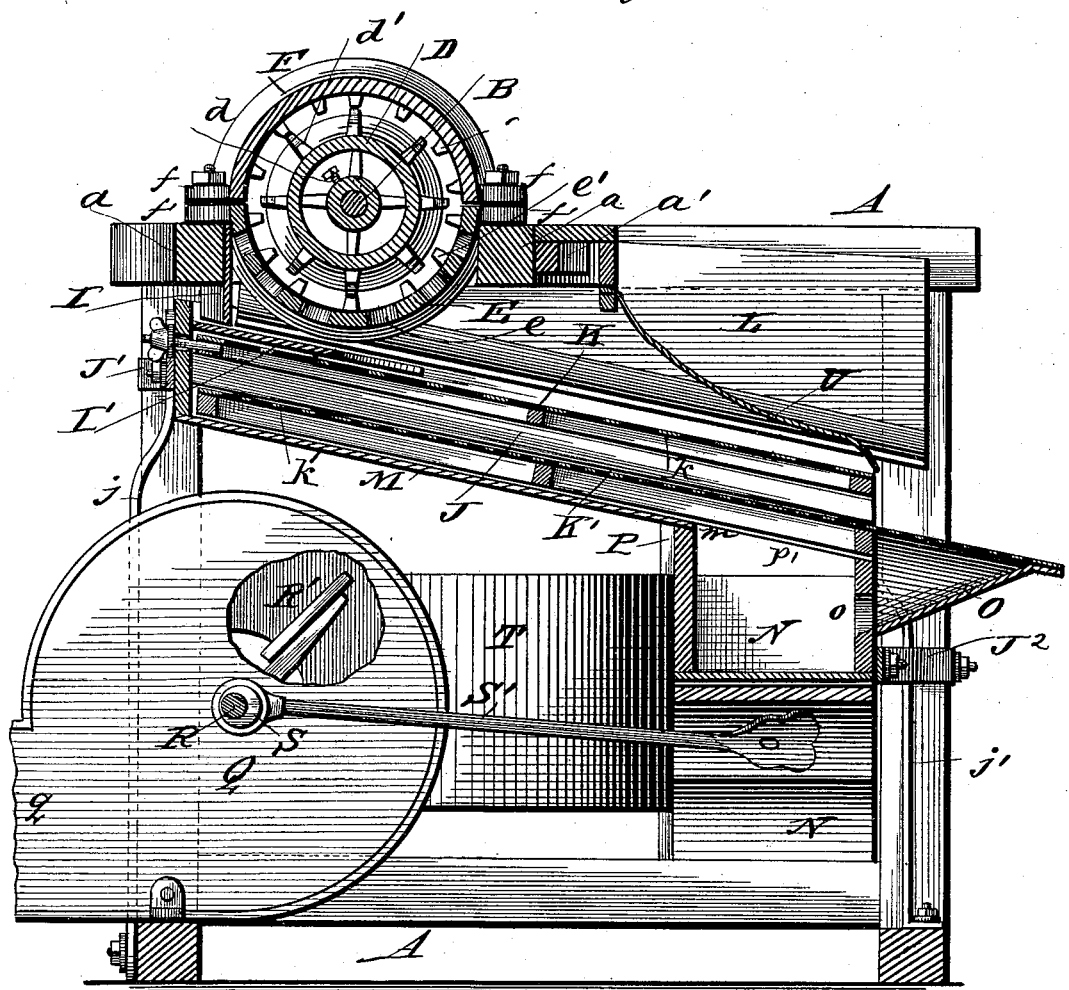
Figure 6:
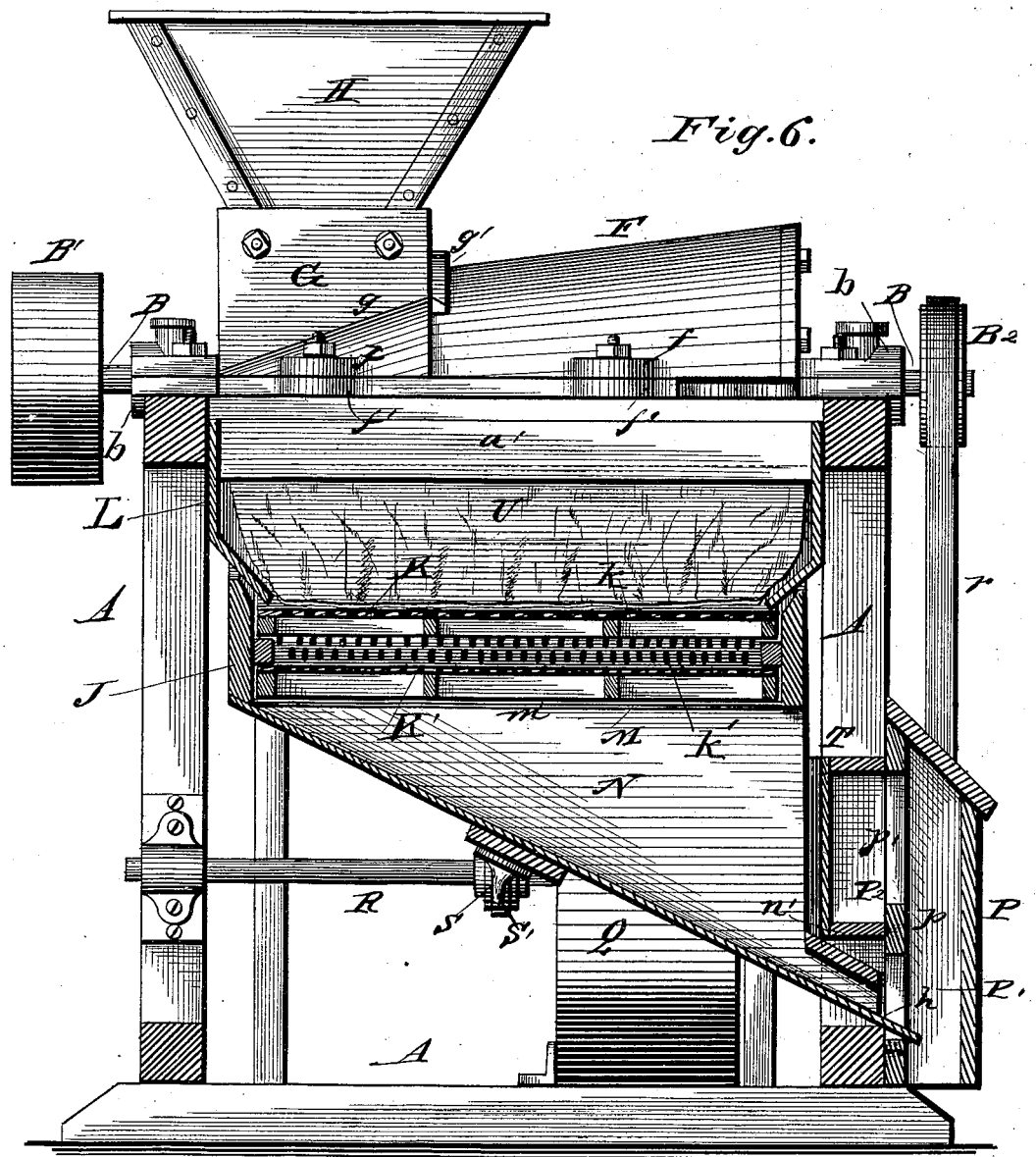
Figure 7:
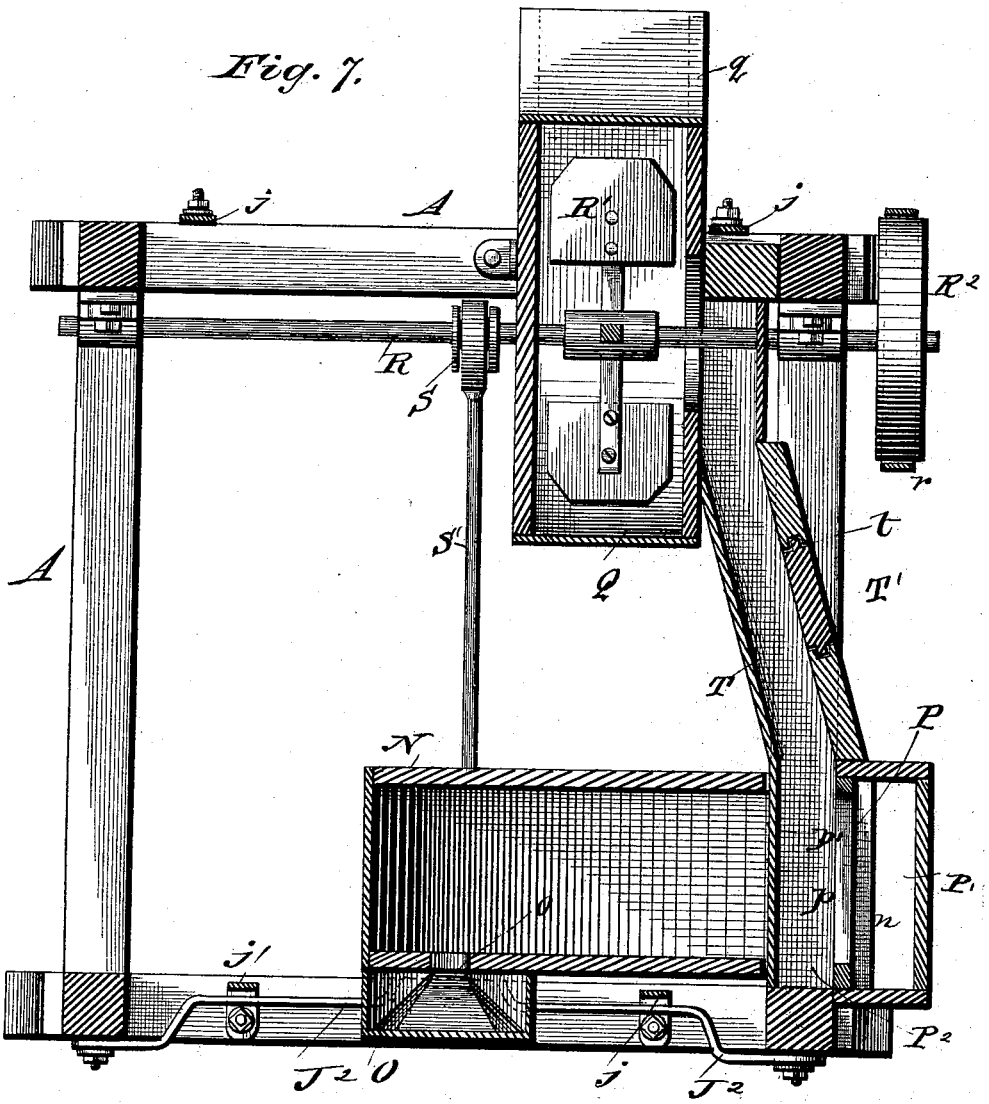

Figure 1 is a side elevation of our machine. Fig. 2 is a front elevation. Fig. 3 is a vertical section on line $x\ x$, Fig. 1. Fig. 4 is a plan view with parts removed. Fig. 5 is a transverse section on the line $w\ w$, Fig. 2. Fig. 6 is a vertical section on the line $z\ z$, Fig. 1. Fig. 7 is a horizontal section on the line $y\ y$, Fig. 1. Figs. 8, 9, 10, 11, and 12 represent parts in detail.

The invention relates to improvements in corn-shelling machines, and consists in the construction and novel arrangement of parts hereinafter described and pointed out in the appended claims.

Referring to the accompanying drawings by letter, A is the frame of the machine; B, the driving-shaft; C C, the conveyers; D, the corn-sheller; H, the hopper; J, the screen-frame carrying the upper screen K and lower screen K'; N and O, the inclined ways conveying the shelled corn to the separator P; R', the fan on the shaft R, carrying the pulley $R^2$, driven by the belt $r$ from the pulley $B^2$ on the driving-shaft, and T, the air-flue connecting the fan-case Q with the separator P.

A is the rectangular frame of the machine, upon the top of which the transverse driving-shaft B turns in the bearings $b\ b$. The said shaft is situated near the receiving end of the machine, as shown.

B' is the driving-pulley on one end of the shaft B, outside of a bearing, $b$, and $B^2$ is a pulley on the other end of said shaft. A belt from the pulley $B^2$ drives the pulley $R^2$ on the fan-shaft and rotates the latter.

C C are feeding-collars on the shaft B, each provided with the two outstanding opposite blades $c$, inclined to the axis of the collar so as to serve as conveyer-blades whe the shaft B rotates. The said collars are situated below the discharge-opening of the hopper, hereinafter described, and are secured to the shaft B so as to have the blades $c$ of adjacent collars C alternate around the circumference of the shaft by set-screws $c'$.

D is a hollow cone-shaped sheller, secured to the shaft by the set-screws $d$, which pass through end collars forming a part of the frame of the cone. The smaller end of the sheller is adjacent to the conveyer-collars C and its base to the side of the frame opposite the driving-pulley. The sheller D is provided around its outer surface with the teeth $d'$, which lie around it in circumferential rows, and which, when the shaft rotates, pass between rows of similar teeth, $e'$, on the inner surface of the concave semi-cone-shaped casting E, which has its edges provided with ears $f''$, bolted to the transverse beams $a$ and $a'$ of the main frame, and underlies both the sheller D and the conveyer-collars C.  $e\ e$ are longitudinal slots in the casting E, arranged in longitudinal rows between the teeth $e'$.

F is a semi-cone-shaped casing overlying the sheller D, and provided near its larger end with ears $f$, through which it is secured by bolts passed through the ears $f'$ of the casting E down to the main frame. The larger end of the casing F has bolted to it the semicircular covering-plate $f^2$, to prevent the corn from flying out when shelling.

G is the rectangular casing, to the upper end of which the hopper is secured. The said casing is bolted to the main frame, and provided with the curved side flanges, $g$, which lie against the edge of the smaller end of the casing F when in place, and the flange $g'$ made on the arc of a circle and standing inward from the side of the casing G, so as to fit closely down on the smaller end of the casing F. By means of the flanges $g$ and $g'$ the casing F is kept in position by the use of two bolts only, which pass through the ears $f$ and $f'$, as described.

H is the hopper, having three vertical sides, and the outwardly and upwardly inclined side $h^2$. $h'$ are opposite flanges which slant vertically downward from the discharge-opening of the hopper, one from the under surface of the side $h^2$ and the other from the opposite edge of the discharge-opening. The side $h^2$ is continued downward, so as to form the inclined flange $h^3$, which enters the casing G, overlies the conveyer-collars C, and prevents the shelled corn from flying upward out of the hopper. The flanges $h'$ are bolted to the casing F in such manner that the hopper and consequently the side $h^2$ and flange $h^3$ can be reversed when the motion of the shaft B is reversed. The collars in that case are reversed on the shaft, so as to reverse the inclination of the blades $c$ and make them feed in the proper direction. The hopper is always so secured to the casing G as to overlie the sides of the collars that are moving upward, and so deflect the grain thrown upward down in the casting E.

I is a plate secured by its upper edge to the front transverse beam, $a$, of the main frame, and inclining thence downward and backward below the level of the casting E. I' is a plate secured by its ends to the front end of the screen-frame and inclining downward therewith. The plates I and I' form an obtuse angle with each other.

J is the screen-frame, supported at its front end by the transverse spring-strap J', which has its ends bolted to the front legs of the main frame and its center bolted to the center of the front transverse beam of the screen-frame. The rear end of the screen-frame is supported by a strap, J², similarly attached to the rear legs of the main frame and to the screen-frame. The said frame oscillates longitudinally, and is restrained and guided in its action by the front vertical metal straps, $j$, and the similar rear straps, $j'$, which connect the base of the frame A with the front and rear transverse beams of the screen-frame, respectively. The screen-frame inclines downward from front to rear, and has secured within it the upper screen K, provided with the slots $k$, and the lower screen, K', parallel with the upper screen, provided with slots $k'$, smaller than the slots $k$, and extending some distance further rearward than the upper screen.

L L are side plates secured to the side beams of the top of the frame A, and curving thence inward over the upstanding plates $l\ l$, secured to the side edges of the screen-frame, above the upper screen.

M is a metal plate secured to the bottom of the screen-frame and entirely covering the same from end to end. The lower end of said plate is secured to the lower edge of the lower screen.

N is an inclined carrier-way, having its upper end secured to the plate M, and communicating with the same by a slot, $m$.

O is a forwardly-inclined carrier, running from below the rearward extension of the lower screen and communicating with the carrier N through the opening $o$, the carrier N communicating with the lower edge of the plate M. The carrier O discharges into the carrier N, and the latter discharges into a vertical separator-box, P, secured to the outside of the frame of the machine. The discharge-orifice $h$ of the carrier N opens into the lower part of the separator-box P, and above the said orifice stands a vertical diaphragm, $p$, which divides the separator-box into an exterior chamber, P', and an interior chamber, P², which are separated below by the horizontal partition $n'$. The partition $p$ is preferably in line with the side of the frame of the machine, and allows communication between the chambers P' and P² by the upper opening, $p'$.

Q is the fan or blower case of the machine, having the front opening, $q$.

R is the fan-shaft, standing transversely across the machine, turning in proper bearings on the main frame and carrying the fan or blower R', which rotates in the case Q. The extended end of the shaft R below the pulley B² is provided with a pulley, R², which receives motion from the former pulley by means of the belt $r$.

S is an eccentric on the shaft R, on the inner side of the fan-case, and S' is a rod connecting the band of said eccentric with the lower surface of the inclined carrier N, the connecting-rod S' being pivoted on said surface of the carrier. It is evident that as the fan-shaft R is rotated by the belt $r$ and pulley B², the screen-frame, attached upper and lower screens, and inclined carriers N and O will be reciprocated together.

T is the air-flue running from the fan-casing Q to the interior chamber P², so as to draw air therefrom when the fan rotates. T' is a vertical slide, having its edges rabbeted so as to move upward in corresponding grooves in an opening, $t$, in the outer wall of the flue T. The slide T' has the engaging-plate $t'$ in its upper end that holds it from slipping down when it has closed the opening $t$.

The fan-case and the carriers N and O may, if desired, be set up on the other side of the frame A, and the flue T and slide T' would require no alteration to be adapted thereto.

U is a cloth shield having its forward edge secured to the transverse beam $a'$ of the main frame and lying above the upper screen. Its function is to direct the grains thrown out from the sheller down on the upper screen and prevent them from scattering out over the upper edges of the main frame.

The operation of the machine is as follows: The full cobs are fed into the hopper H, whence they descend to the conveyer-collars C C, which act also as shellers. The said collars are so set on the shaft B as to convey by means of the blades $c$ the cobs (partially shelled) to the cone-shaped sheller D. When the rotation of the shaft is reversed the collars are set thereon in the opposite direction, so as to reverse the inclination of the blades $c$. As the grains are knocked off the cobs by the blades c, and afterward by the teeth d', coacting with the teeth e', they fall through the slots e in the casing E, and are received on the plate I', which directs them on the upper screen K, and prevents them from being thrown vertically downward. They are prevented from being thrown forward by the plate I, secured to the main frame. The grains that pass out of the open base of the sheller drop onto the plate I', and from thence pass onto the upper screen. The upper screen K, having larger slots than the lower screen, lets the grain fall on the latter, which allows them to pass through its slots onto the plate M, which passes them through the inclined carrier N to the separator-box P. Should any grains be carried on top of husks when passing over the upper screen K they will be thrown off when the husks fall therefrom onto the rear projection of the lower screen K', and will fall through the perforations of the lower screen onto the longitudinal carrier O, whence they will pass into the carrier N to be delivered to the separator P. The stripped cobs are delivered over the tail of the machine, but the grains are delivered into the lower part of the chamber P' of the separator. They then fall into a proper receptacle, and while falling have the dust and dirt drawn from them by the action of the fan R', the rotation of which draws the air out of the chamber P² of the separator, and thence out of the grain-chamber P' by way of the opening p'. Should the inclined carrier N be reversed the fan and fan-case are secured on the opposite side of the machine and the air-tube T secured thereto.

Having thus fully described our invention, we claim—

1. In a corn-shelling machine, the combination, with the shelling mechanism, substantially as described, the driving-shaft B, the collars C, provided with the conveyer-blades c, and adjustably secured to said shaft, of the reversible hopper H, having the flange $h^3$ arranged to lie over the conveyer-blades c on the side toward which the latter ascend, substantially as specified.

2. In a corn-shelling machine, the combination, with the shelling mechanism, substantially as described, the hopper H, and the casing F, of the casing G, to which the hopper is secured, and which is provided with the flanges g, the edges of which lie against the edge of the smaller end of the casing F, and the curved flange g', which overlies the smaller end of the casing F and keeps the same in place, substantially as specified.

3. In a corn-shelling machine, the combination of the reversible hopper H, shaft B, and reversible collars C, having the conveyer-blades c, cone-shaped sheller D, casing F, and semi-cone-shaped casting E, with the plates I and I', and reciprocating screen-frame J, provided with the screens K and K', substantially as specified.

4. In a corn-shelling machine, the combination of the hopper H, the main shaft B, and the shelling mechanism composed of the collars C, cone-shaped casting D, and semi-cone-shaped castings E and F, with the reciprocating screen-frame J, the screens K K, and carriers N O, all attached to and reciprocating with the said frame, the separator-box P, divided into the compartments P' and P², communicating only at their upper ends, the air-flue T, and the fan situated in the casing Q, and mounted on a shaft driven by a pulley on the driving-shaft, substantially as specified.

5. In a corn-shelling machine, the combination, with the shaft B, sheller D, casting E, casing F, and screen-frame J, having the screens K K' and carriers N O attached and moving therewith, of the separator-box P, air-flue T, provided with the reversible door T', casing Q, fan R', and fan-shaft R, driven from the shaft B, substantially as described.

In testimony that we claim the foregoing as our own we affix our signatures in presence of two witnesses.

HEMAN A. BARNARD.
JOHN B. CORNWALL.

Witnesses:
W. J. ENTRIKIN,
J. B. OAKLEAF.